United States Patent
Flotkoetter et al.

(10) Patent No.: US 10,730,459 B2
(45) Date of Patent: Aug. 4, 2020

(54) VEHICLE ELECTRONIC SYSTEM

(71) Applicant: Nissan North America, Inc., Franklin, TN (US)

(72) Inventors: Robert Flotkoetter, Novi, MI (US); Dan Magee, Smyrna, TN (US)

(73) Assignee: Nissan North America, Inc., Franklin, TN (US)

( * ) Notice: Subject to any disclaimer, the term of this patent is extended or adjusted under 35 U.S.C. 154(b) by 149 days.

(21) Appl. No.: 15/992,936

(22) Filed: May 30, 2018

(65) Prior Publication Data
US 2019/0366954 A1 Dec. 5, 2019

(51) Int. Cl.
*B60R 16/03* (2006.01)
*B60L 1/00* (2006.01)
*B60K 6/22* (2007.10)

(52) U.S. Cl.
CPC ............ *B60R 16/03* (2013.01); *B60K 6/22* (2013.01); *B60L 1/00* (2013.01); *B60Y 2200/92* (2013.01); *B60Y 2300/91* (2013.01); *Y10S 903/904* (2013.01)

(58) Field of Classification Search
CPC ....... B60R 16/03; B60L 1/00; B60Y 2300/91; B60Y 2200/92; B60K 6/22
USPC ..... 307/10.6, 10.1, 10.2, 9.1, 43, 66, 64, 80, 307/82, 38
See application file for complete search history.

(56) References Cited

U.S. PATENT DOCUMENTS

| | | | |
|---|---|---|---|
| 6,639,511 B2* | 10/2003 | Haruna | B60R 25/04 307/10.1 |
| 7,696,716 B2 | 4/2010 | Siddiqui et al. | |
| 8,525,368 B2 | 9/2013 | Perhats, Sr. | |
| 9,007,015 B1 | 4/2015 | Nook et al. | |
| 9,405,120 B2 | 8/2016 | Graf et al. | |
| 2005/0285559 A1 | 12/2005 | Siddiqui et al. | |
| 2006/0250501 A1 | 11/2006 | Widmann et al. | |
| 2008/0157593 A1* | 7/2008 | Bax | B60L 50/61 307/10.1 |
| 2013/0073136 A1* | 3/2013 | Yamamoto | B60W 10/08 701/22 |
| 2013/0264867 A1* | 10/2013 | Mitsutani | B60L 58/40 307/10.1 |

(Continued)

FOREIGN PATENT DOCUMENTS

GB 2415839 A 1/2006

*Primary Examiner* — Rexford N Barnie
*Assistant Examiner* — Jagdeep S Dhillon
(74) *Attorney, Agent, or Firm* — Global IP Counselors, LLP

(57) ABSTRACT

A vehicle electronic system having an electronic controller and a power switching device configured to switch between a first power setting and a second power setting. The first power setting includes powering at least one of a plurality of electrically powered accessories with power from an on-board electric power supply. The second power setting includes powering the at least one of the plurality of electrically powered accessories with power from an external power supply thereby preventing the use of electric power from the on-board electric power supply. The electronic controller is configured to electronically operate the switching device to switch between the first power setting and the second power setting such that in response to detection of power from the external power supply, the switching device is switched to the second power mode.

14 Claims, 3 Drawing Sheets

(56) References Cited

U.S. PATENT DOCUMENTS

| | | | | |
|---|---|---|---|---|
| 2014/0084679 | A1* | 3/2014 | Li | B60L 8/003 |
| | | | | 307/10.1 |
| 2014/0203634 | A1* | 7/2014 | Sugiyama | B60L 3/04 |
| | | | | 307/10.1 |
| 2017/0079480 | A1* | 3/2017 | Tsibulevskiy | A47G 1/00 |
| 2017/0306821 | A1* | 10/2017 | Hashimoto | G01R 19/0092 |
| 2018/0351366 | A1* | 12/2018 | Handelsman | H02J 3/40 |
| 2019/0092182 | A1* | 3/2019 | Gersch | H02J 3/32 |

\* cited by examiner

VEHICLE ELECTRONIC SYSTEM

BACKGROUND

Field of the Invention

The present invention generally relates to a vehicle electronic system. More specifically, the present invention relates to a vehicle electronic system that operates a power switching device that switches from an on-board power supply to an external power supply in order to eliminate electric loads drawing down the on-board power supply when the vehicle is not operating.

Background Information

Vehicles are typically provided with a plurality of electrically powered accessories, such as, for example, an audio device, wireless communication devices and video cameras. When the vehicle is not operating, and, a vehicle operator or passenger wishes to use one or more of the plurality of electrically powered accessories, use of one or more of the plurality of electrically powered accessories drains power from an on-board power supply, such as a rechargeable battery.

SUMMARY

One object of the present disclosure is to provide an electronic controller with a power switching capability that allows a vehicle operator to use one or more of a plurality of electrically powered accessories without draining power from an on-board power supply, such as a rechargeable battery.

In view of the state of the known technology, one aspect of the present disclosure is to provide a vehicle with a vehicle electronic system that includes an on-board electric power supply, an external power supply, a plurality of electrically powered accessories, a power switching device and an electronic controller. The on-board electric power supply is installed within the vehicle and is configured to supply electric power to the vehicle. The external power supply is configured to be manually connected and manually disconnected from the vehicle. The power switching device is connected to the on-board electric power supply and the external power supply. The power switching device is configured to switch between a first power setting and a second power setting. The first power setting includes powering at least one selected electrically powered accessory of the plurality of electrically powered accessories with power from the on-board electric power supply. The second power setting includes powering the at least one selected electrically powered accessory of the plurality of electrically powered accessories with power from an external power supply thereby preventing the use of electric power from the on-board electric power supply to at least one selected electrically power accessory while power is being drawn from the external power supply. The electronic controller is connected to the on-board electric power supply, the electronic port, the plurality of electrically powered accessories and the power switching device. The electronic controller is configured to electronically operate the switching device to switch between the first power setting and the second power setting such that in response to detection of power from the external power supply selection of the at least one selected electrically powered accessory of the plurality of electrically powered accessories, the switching device is switched to the second power mode.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
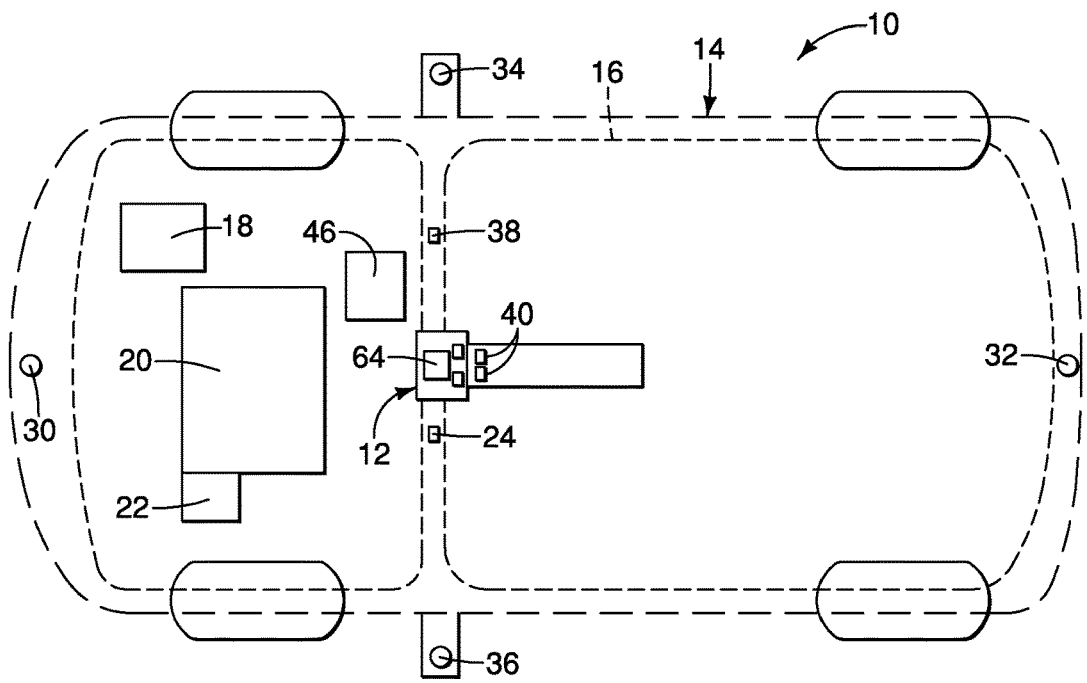
FIG. 1 is a schematic top view of a vehicle that includes a vehicle electronic system in accordance with one depicted embodiment.

Referring initially to FIG. 1, a vehicle 10 having an electronic system 12 (FIG. 2) is illustrated in accordance with a first embodiment.

The vehicle 10 includes a vehicle body structure 14 that defines a passenger compartment 16. The vehicle 10 includes, among other features and components, a rechargeable battery 18, a power plant 20, a charging device 22, an ignition switch 24, lights 26, a forward camera 30, a rear camera 32, a first side camera 34, a second side camera 36, an optional dash camera 38 and the electronic system 12.

The rechargeable battery 18 defines an on-board electric power supply that is electrically connected to the charging device 22 such that with the power plant 20 operating, the charging device 22 charges the rechargeable battery 18.

The power plant 20 can be any of a variety of vehicle power supply devices, such as a gasoline powered internal combustion engine, a diesel engine, a hybrid system (electric motor and gasoline powered engine) or an electric motor.

The charging device 22 can be a conventional alternator (an electricity generating device) and/or energy reclamation devices such as electric generator connected to the drive train (not shown) of the vehicle 10 that generate electricity when the brakes (not shown) are applied.

The ignition switch 24 is at least connected to both the rechargeable battery 18 and a starter motor (not shown) of the power plant 20. The ignition switch 24 is a manually operated device (or a remotely operated device) that is operated to start the power plant 20 and shut off the power plant 20. More specifically, the ignition switch 24 is configured to be manually operated to switch the power plant 20 between an operating state and an off-state.

The lights 26 (shown in FIG. 2) can include the headlights, running lights, tail lights, brake lights, backup lights and interior lights of the vehicle 10. Since vehicle lights and lighting are conventional automotive components, further description is omitted for the sake of brevity.

Figure 2:
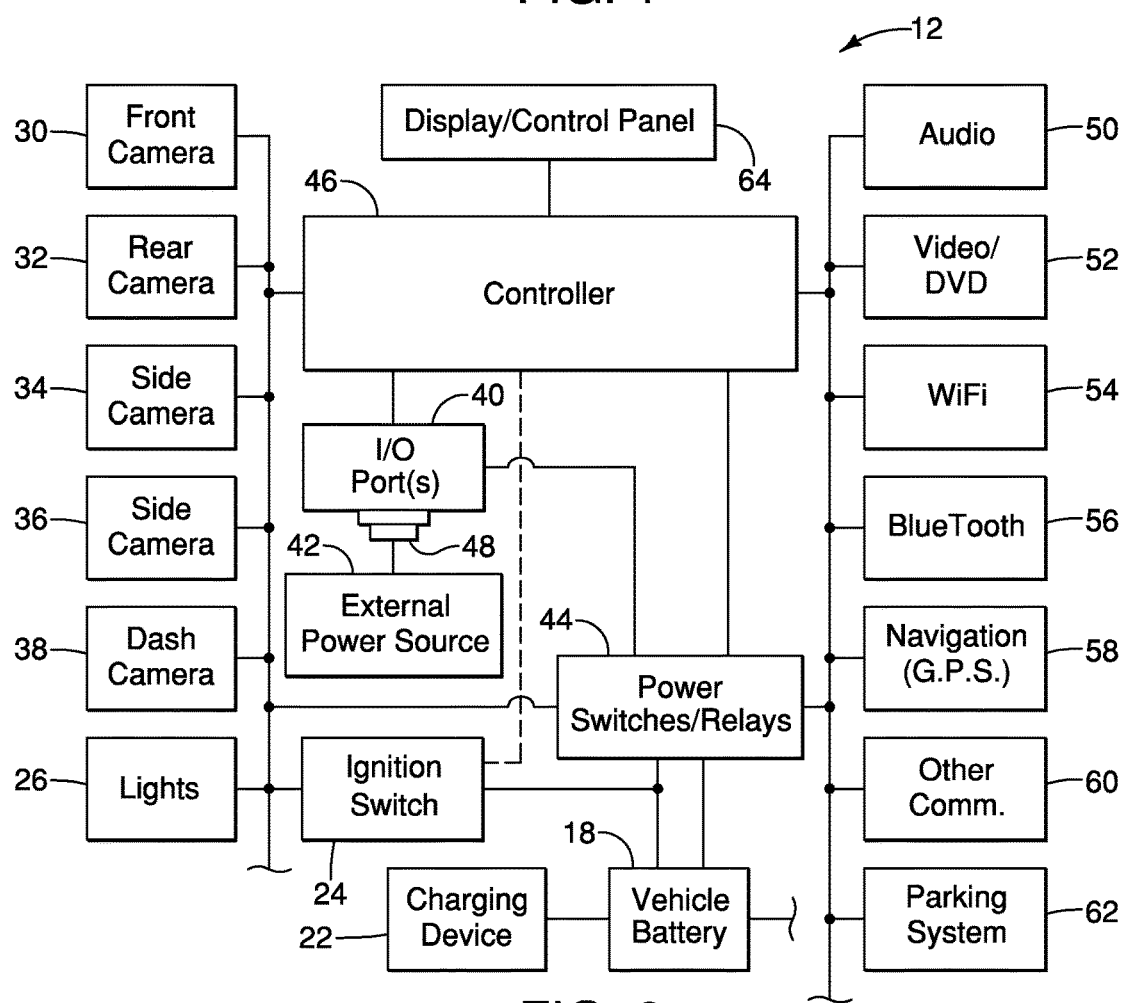
FIG. 2 is a block diagram of the various elements of the vehicle electronic system in accordance with the depicted embodiment.

As shown in FIG. 2, the electronic system 12 (a vehicle electronic system) is installed within the vehicle 10 and is electrically connected to the rechargeable battery 18, the power plant 20, the charging device 22, the ignition switch 24, the lights 26, the front camera 30, the rear camera 32, the first side camera 34, the second side camera 36 and the optional dash camera 38 in a manner described in greater detail below.

The electronic system 12 further includes an electronic input/output port 40, a plurality of electrically powered accessories (described individually in greater detail below), an external power supply 42, a power switching device 44 and an electronic controller 46.

The electronic input/output port 40 includes, for example, one or more USB ports, power connectors, or other communications related ports that also provide power transfer therethrough in a manner consistent with the capabilities of a USB port (also referred to as a universal serial bus). As is described in greater detail below, the electronic input/output port 40 (the USB port) is configured to supply electric power to the electronic system 12 of the vehicle 10.

For example, with the power plant 20 in the operating state (and ignition switch 24 in an on position), the charging device 22 supplies electrical current to the on-board electric power supply 18 (the rechargeable battery 18) in order charge the rechargeable battery 18, and the charging device 22 provides power to the electronic input/output port 40. However, with the ignition switch 24 and the power plant 20 in the off-state (and ignition switch 24 in an off position), the charging device 22 does not supply electrical current to the on-board electric power supply 18 (the rechargeable battery 18), to the plurality of electrically powered accessories, or the electronic input/output port 40.

The external power supply 42 can be manually connected to and manually disconnected from the electronic input/output port 40. The external power supply 42 can be the battery within a cell phone, a portable MP3 music player or similar device, or can be a hand held battery such as those for use as a supplementary power supply for a cell phone, a portable MP3 player, portable DVD player or other personal device.

The external power supply 42 includes a connector 48 that is removably connected to and easily disconnected from the electronic input/output port 40.

The plurality of electrically powered accessories can include any of a variety of accessories. However, in the depicted embodiment (FIG. 2), the plurality of electrically powered accessories includes, for example, an audio device 50, a video device 52, a WiFi communication device 54, a Bluetooth communication device 56, a navigation system 58 (GPS) and other communication devices 60 (for example, a cellular telephone communications device).

Each of the audio device 50, the video device 52, the WiFi communication device 54, the Bluetooth communication device 56, the navigation system 58 (GPS) and other communication devices 60 are typically systems that are not provided with power when the ignition switch 24 is off (the power plant 20 is in the off-state), and are provided with electrical power when the ignition switch 24 is on (with the power plate 20 in the operating state).

The electronic system 12 also includes a parking system 62 (also referred to as an all-around view video system that assists the vehicle operator when parking). The parking system 62 includes the front camera 30, the rear camera 32, the first side camera 34, the second side camera 36, and can further include the optional dash camera 38. With the ignition switch 24 in the off position, the parking system 62 is not operated. However, as is described in greater detail below, the electronic system 12 is configured to selectively provide power to and operate the front camera 30, the rear camera 32, the first side camera 34, the second side camera 36, and the optional dash camera 38 with the ignition switch 24 in the off position.

Figure 3:
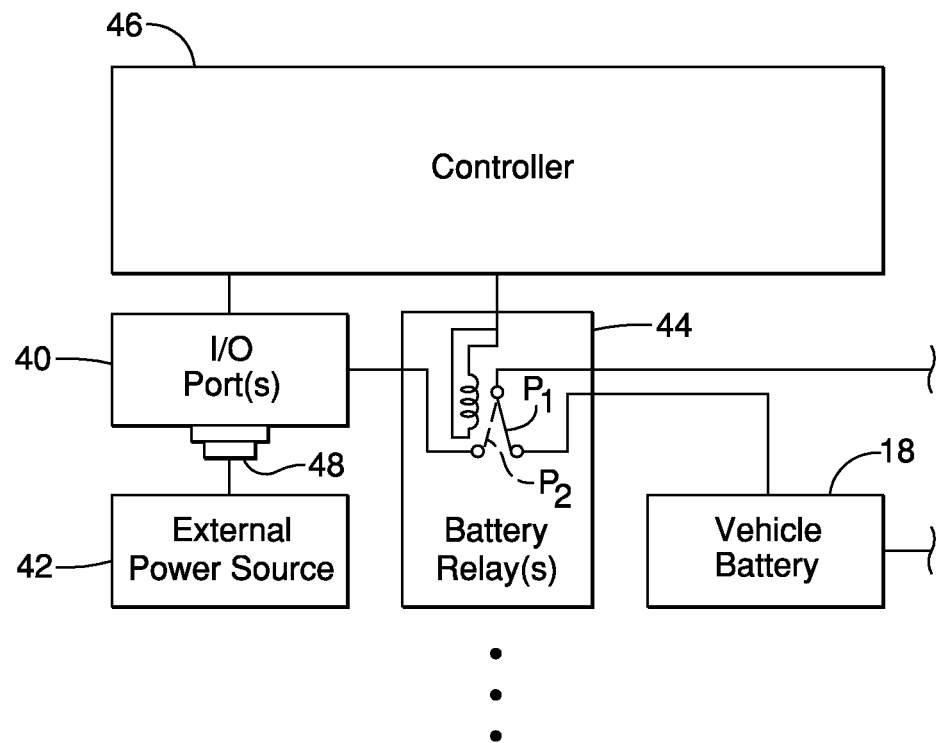
FIG. 3 is a block diagram showing portions of the vehicle electronic system including a power switching device controlled by an electronic controller that switches between a first power setting and a second power setting in accordance with the depicted embodiment.

A description of the power switching device 44 is now provided with specific reference to FIG. 3. The power switching device 44 is connected to the on-board electric power supply 18 (via operation of the ignition switch 24), the input/output electronic port 40 and the controller 46. The power switching device 44 can include a plurality of relays (switches), one relay (switch) for each of the audio device 50, the video device 52, the WiFi communication device 54, the Bluetooth communication device 56, the navigation system 58 (GPS) and other communication devices 60, and the cameras 30, 32, 34, 36 and 38. Each of the plurality of relays is independently operable by the electronic controller 46, as is described in greater detail below. Alternatively, the electronic system 12 can be provided with only one relay that defines the power switching device 44. Regardless, the relay or relays that define the power switching device 44 operate in a conventional manner. Specifically, an electric conductor blade is pivoted or moved between a first position $P_1$ and a second position $P_2$. Movement of the blade is controlled by the electronic controller 46. Since relays and switches are convention vehicle components, further description is omitted for the sake of brevity.

As shown in FIG. 3, the power switching device 44 is configured to switch between a first power setting (corresponding to $P_1$) and a second power setting (corresponding to $P_2$). The first power setting includes powering at least one selected electrically powered accessory of the plurality of electrically powered accessories with power from the on-board electric power supply 18. The second power setting includes powering at least one electrically powered accessory of the plurality of electrically powered accessories with power from the external power supply 42 that is plugged into the electronic input/output portion 40. With the power switching device 44 set in the second power setting to power the selected electrically powered accessory(s), draining of the on-board electric power supply 18 (the rechargeable battery 18) is prevented, by preventing the use of electric power from the on-board electric power supply 18 b the at least one selected electrically power accessory. A process for selecting one or more of the plurality of electrically powered accessories is described in greater detail below.

The input panel/display 64 is installed to an instrument panel within the passenger compartment 16 in a location convenient to the vehicle operator. The input panel/display 64 can be used by the electronic controller 46 in many different functions of the vehicle 10, such as selection and adjustment of the audio device 50, the video device 52, the WiFi communication device 54, the Bluetooth communication device 56, the navigation system 58 (GPS), other communication devices 60, and parking system 62 (operation of the cameras 30, 32, 34, 36 and 38 and displaying direct and compensated images received from the cameras 30, 32, 34, 36 and 38).

Figure 4:
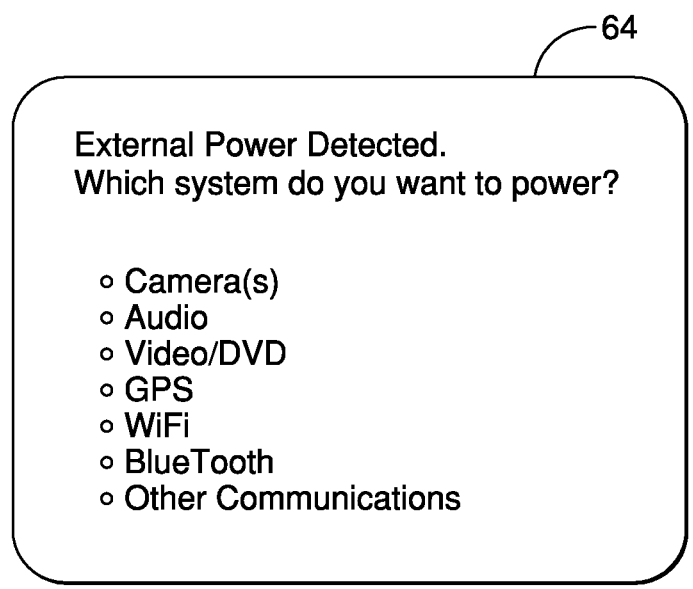
FIG. 4 is a menu shown on a display of the vehicle electronic system in accordance with the depicted embodiment.

As shown in FIG. 4, the electronic controller 46 can cause the input panel/display 64 to display a list of the plurality of the plurality of electrically powered accessories. The vehicle operator can use a touch sensitive screen of the input panel/display 64 to select one or more of the plurality of the plurality of electrically powered accessories that is to be powered by the external power supply 42, as is described in greater detail below.

As shown in FIG. 2, the electronic controller 46 is connected to the on-board electric power supply 18, the input/output electronic port 40, the power switching device 44, the plurality of electrically powered accessories (the audio device 50, the video device 52, the WiFi communication device 54, the Bluetooth communication device 56, the navigation system 58 (GPS), other communication devices 60 and the cameras 30, 32, 34, 36 and 38).

The electronic controller 46 is configured to electronically operate the power switching device 44 to switch between the first power setting (corresponding to $P_1$ of the power switching device 44 or the power switching devices 44) and the second power setting (corresponding to $P_2$ of the power switching device 44 or the power switching devices 44) in response to detection of power from the external power supply 42 and selection of the at least one selected electrically powered accessory of the plurality of electrically powered accessories.

The electronic controller 46 is further configured to detect the state of the power plant 20 (whether in the operating state or in the off-state). The electronic controller 46 is also configured to detect the state of the external power supply 42. Specifically, the electronic controller 46 is configured to detect whether or not the external power supply 42 is plugged, and whether or not the external power supply has sufficient power to operate one or more selected ones of the plurality of electrically powered accessories. In other words, the electronic controller 46 can detect and determine a power output level of the external power supply 42 with the power switching device 44 in the second power setting. Further, in response the determining that the power output level of the external power supply 42 has dropped below a predetermined level, the electronic controller 46 is configured to shuts off the selected electrically powered accessory or accessories and electronically operate the power switching device 44 to switch from the second power setting to the first power setting. Further, the electronic controller 46 is further configured to switch the power switching device 44 to the second power setting in response to detecting that the power plant in the off-state, with power from the external power supply 42 being sufficient to operate one or more of the plurality of electrically powered accessories.

The electronic controller 46 is also configured to operate the input panel/display 64 such that the input panel/display 64 displays a list of the plurality of electrically powered accessories in further response to detection of power from the external power supply 42. As well, the electronic controller 46 is further configured to compare the power available from the external power supply 42 and corresponding power requirements of each of the plurality of electrically powered accessories and operate the input panel/display 64 to display only those ones of the plurality of electrically powered accessories with power requirements that can be met by power available from the external power supply 42.

The electronic controller 46 includes a Central Processing Unit (CPU) or a Micro-Processing Unit (MPU). The electronic controller 46 can be a body control module (BCM) of the vehicle 10, an engine electronic control module (ECM), a stand alone control module separate from the BCM and the ECM, or a single control module that monitors and operates all systems on the vehicle 10. Preferably, the electronic controller 46 includes one or more processors and one or more storage devices. The memory device stores programs used by the electronic controller 46. The memory device is any computer storage device or any computer readable medium with the sole exception of a transitory, propagating signal. For example, the memory device can be nonvolatile memory and volatile memory, and can includes a ROM (Read Only Memory) device, a RAM (Random Access Memory) device, a hard disk, a flash drive, etc.

The processor(s) (microcomputer) of the electronic controller 46 is programmed to monitor signals received from the various sensors and devices attached to the electronic controller 46, as shown schematically in FIG. 2. The memory device(s) or memory circuits of the electronic controller 46 store processing results and control programs such as ones for operation of the power switching device 44 and operation of each of the plurality of electrically powered accessory(s) that are run by the processor circuit of the electronic controller 46. The electronic controller 46 is operatively coupled to the various devices and cameras depicted in FIG. 2, in a conventional manner.

It will be apparent to those skilled in the art from this disclosure that the precise structure and algorithms for the electronic controller 46 can be any combination of hardware and software that will carry out the functions of the present invention.

The vehicle 10 includes many conventional components that are well known in the art. Since vehicle components (other than those of the electric system 12 of the vehicle 10) are well known in the art, these structures will not be discussed or illustrated in detail herein. Rather, it will be apparent to those skilled in the art from this disclosure that the components can be any type of structure and/or programming that can be used to carry out the present invention.

Figure 5:
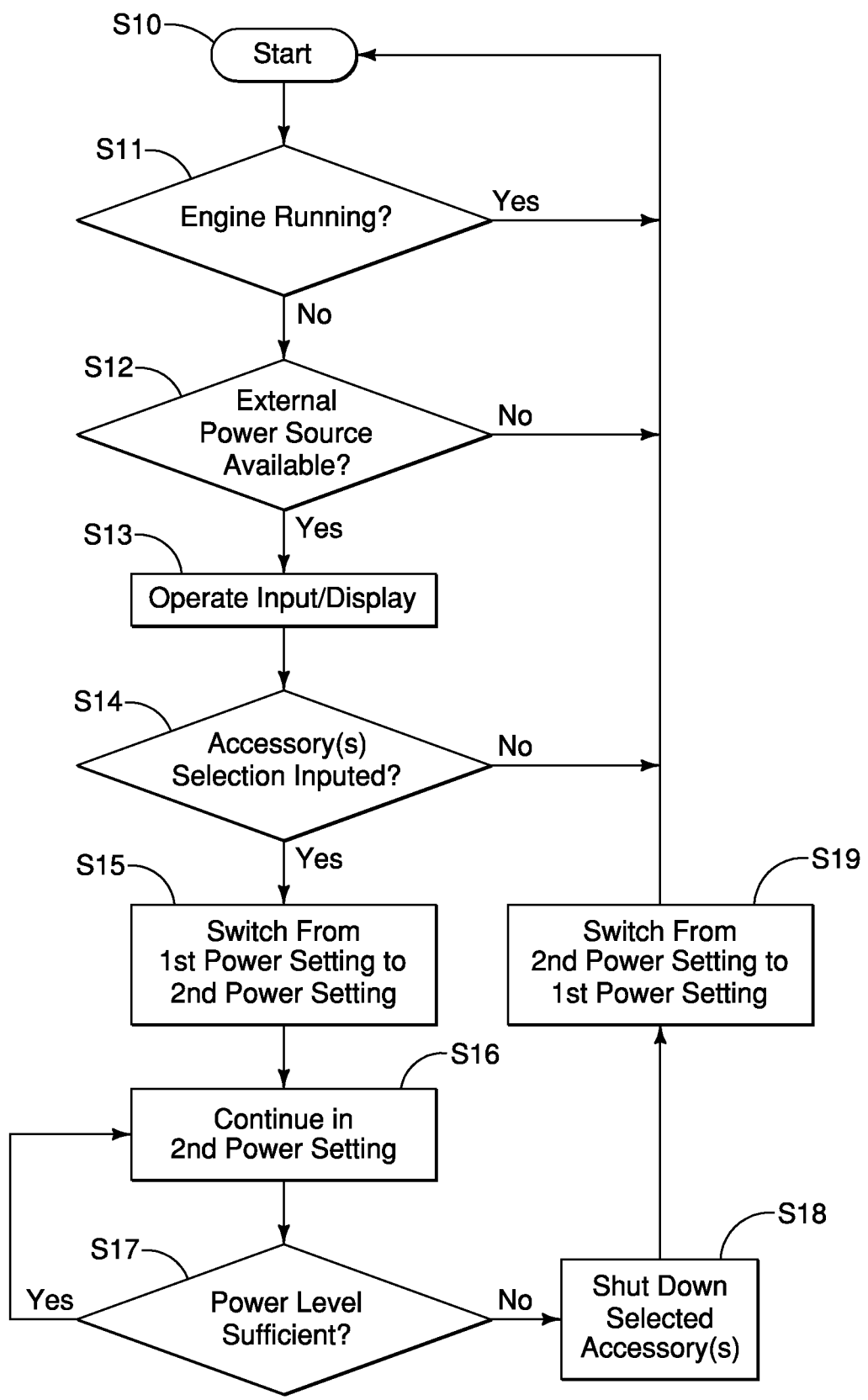
FIG. 5 is flowchart showing one example of logic conducted by the electronic controller for operating the power switching device in accordance with the depicted embodiment.

A description of one example of control logic carried out by the electronic controller 46 is now provided with specific reference to FIG. 5. Initially, the power switching device 44 is in the first power setting (corresponding to $P_1$) with power being supplied to the plurality of electrically powered accessories from the rechargeable battery 18 (the vehicle battery). At step S10, the electronic controller 46 detects a change in operation of the vehicle 10, prompting the start of the operating logic. For example, one change detected by the electronic controller 46 can be a change in the position of the ignition switch 20 between the operating state and the off-state. At step S11, the electronic controller 46 determines whether or not the power plant 20 (the engine) is operating. If the power plant 20 is operating (and the ignition switch 24 is in the on state), logic returns to step S10. If the power plant 20 is not operating and the ignition switch 24 is in the off state or has just been shut off, logic moves to step S12.

At step S12, the electronic controller 46 determines whether or not the connector 48 the external power supply 42 is connected to the electronic input/output port 40 (USB port), and whether or not the external power supply 42 has a sufficient power level that can power to one or more of the plurality of electrically powered accessories. If there is an external power supply 42 connected to the electronic input/output port 40 with sufficient power, then operation moves to step S13. Otherwise, the electronic controller 46 returns to step S10.

At step S13, the electronic controller 46 operates the input panel 64 and its touch screen display. The electronic controller 46 displays a menu of electrically powered accessories such as the menu depicted in FIG. 4 and provides the vehicle operator with sufficient time to select one or more of electrically powered accessories to be provided with power and operated with the ignition switch 24 in the off position. After a predetermined period of time (for example 30 seconds) if no selection is made, operation moves to step S14. Similarly, if one or more accessories is selected within the predetermined period of time, operation moves to step S14.

At step S14, the electronic controller 46 determines whether or not one or more accessories was selected in step S13. If no selection was made, operation returns to step S10. If the electronic controller 46 determines that a selection or several selections were made operation moves to step S15. At step S15, the electronic controller 46 operates the power switching device 44 or corresponding power switching devices 44 to switch from the first power setting to the second power setting thereby providing to the selected one or ones of the plurality of electrically powered accessories.

Next at step S16, the electronic controller 46 monitors the power level of the external power supply 42, continuing to supply power to the selected one or ones of the plurality of electrically powered accessories.

Next at step S17, the electronic controller 46 determines whether or not a sufficient power level continues to be provided from the external power supply 42. If there is sufficient power, operation moves back to step S16. If the power output from the external power supply 42 has dropped below a predetermined threshold, the operation moves to step S18.

At step S18, the electronic controller 46 shuts off each of the selected ones of the plurality of electrically powered accessories, then moves to step S19. At step S19, the electronic controller 46 operates the power switching device 44 or corresponding power switching devices 44 to switch from the second power setting to the first power setting thereby cutting off all power to the selected one or ones of the plurality of electrically powered accessories, where the power was received from the power switching device 44.

As mentioned above, the electronic controller 46 can be configured to operate a single power switching device 44 (a relay) that switches power between the first power setting and the second power setting affecting all of the plurality of electrically powered accessories at the same time. Alternatively, the electronic controller 46 can be configured to operate a plurality power switching devices 44 (relays), a corresponding power switching device for each respective one of the plurality of electrically powered accessories.

When power is provided to any one of the plurality of electrically powered accessories in the second power setting, the selected one or ones of the plurality of electrically powered accessories are powered by the external power supply 42 not the rechargeable battery 18, thereby avoiding draining of the rechargeable battery 18.

Hence, if selected, the audio device 50 can provide music or audio to the vehicle operator and others while the vehicle 10 is parked without draining the rechargeable battery 18.

Similarly, if selected, the video device 52 can provide video, display a DVD film or the like for the vehicle operator and others while the vehicle 10 is parked without draining the rechargeable battery 18.

If selected, the video device 52 can provide video, display a DVD film or the like for the vehicle operator and others while the vehicle 10 is parked without draining the rechargeable battery 18.

If selected, the WiFi communication device 54 and/or the Bluetooth device 56 can provide communications with another WiFi device, another Bluetooth device or allow the vehicle operator to employ hands free communication using the audio device 50 the vehicle 10 to, for example, complete a telephone call.

Further, if selected, the navigation system 58 (GPS) can provide maps, driving route or the like for the vehicle operator and others while the vehicle 10 is parked without draining the rechargeable battery 18.

If selected, the other communication devices 60 can provide, for example, cell phone communication for the vehicle operator and others while the vehicle 10 is parked without draining the rechargeable battery 18.

Further, if selected, any one or more of the cameras 30, 32, 34, 36 and 38 can be used to provide video for areas around the vehicle 10. Further, the dash camera 38 can be used to monitor approaching traffic for the vehicle operator and others while the vehicle 10 is parked without draining the rechargeable battery 18. Still further, the dash camera 38 can be used to record video either to the device that includes the external power supply 43 (for example, a cell phone can include the external power supply 42) or to memory of the electronic controller 46. Similarly, and of the other cameras 30, 32, 34 and 36 can have images or videos captured from and saved.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle electronic system. Accordingly, these terms, as utilized to describe the present invention should be interpreted relative to a vehicle equipped with the vehicle electronic system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle and vehicle electronic system, comprising:
    an on-board electric power supply installed within the vehicle configured to supply electric power to the vehicle;
    an external power supply configured to be manually connected and manually disconnected from the vehicle;
    a plurality of electrically powered accessories;
    an input panel/display configured to display a list of the plurality of electrically powered accessories and the input panel/display being further configured to receive input from a vehicle operator including selecting at least one of the plurality of electrically powered accessories displayed by the input panel/display;
    a power switching device connected to the on-board electric power supply and the external power supply, the power switching device being configured to switch between a first power setting and a second power setting:
    the first power setting includes powering the at least one electrically powered accessory of the plurality of electrically powered accessories with power from the on-board electric power supply, and
    the second power setting includes powering the at least one electrically powered accessory of the plurality of electrically powered accessories with power from an external power supply thereby preventing the use of electric power from the on-board electric power supply to the at least one electrically powered accessory while power is being drawn from the external power supply; and
    an electronic controller connected to the input panel/display, the on-board electric power supply, the plurality of electrically powered accessories and the power switching device, the electronic controller being configured to operate the input panel/display to display the list of the plurality of electrically powered accessories and receive input from the input panel/display of selections made by the vehicle operator including the selection of the at least one of the plurality of electrically powered accessories, the electronic controller being further configured to electronically operate the switching device to switch between the first power setting and the second power setting such that in response to detection of power from the external power supply the at least one of the plurality of electrically powered accessories is provided with power after the switching device is switched to the second power mode.

2. The vehicle and vehicle electronic system according to claim 1, further comprising:
    an electronic input/output port connected to the electronic controller and the power switching device, the external power supply including a connector that is removably connected to the electronic input/output port.

3. The vehicle and vehicle electronic system according to claim 1, wherein
    the on-board electric power supply is a rechargeable battery.

4. The vehicle and vehicle electronic system according to claim 3, wherein
    the vehicle includes a power plant with a charging device that is connected to the rechargeable battery.

5. The vehicle and vehicle electronic system according to claim 4, further comprising:
    an ignition switch connected to the power plant and the battery, the ignition switch being configured to be manually operated to switch the power plant between an operating state and an off-state, and
    the electronic controller is further configured to switch to the second power setting in response to the power plant being in the off-state, in response to detection of power from the external power supply and in response selection of the at least one of the plurality of electrically powered accessories.

6. The vehicle and vehicle electronic system according to claim 1, wherein
    the plurality of electrically powered accessories includes an audio device, a video device, at least one vehicle camera, a security device connected to the at least one vehicle camera, a GPS (global positioning system) and at least one wireless communication device.

7. The vehicle and vehicle electronic system according to claim 1, wherein
    the electronic controller being further configured detect a power output level of the external power supply while in the second power setting, and
    in response the determining that the power output level of the external power supply has dropped below a predetermined level, the electronic controller shuts off the at least one of the plurality of electrically powered accessories and electronically operates the switching device to switch from the second power setting to the first power setting.

8. The vehicle and vehicle electronic system according to claim 1, wherein
    the electronic controller is further configured to compare the power available from the external power supply and corresponding power requirements of each of the plurality of electrically powered accessories and operate the input panel/display to display only those ones of the plurality of electrically powered accessories with power requirements that can be met by power available from the external power supply and receive further selection by the vehicle operator selecting only those ones of the plurality of electrically powered accessories with power requirements that can be met by power available.

9. A vehicle electronic system, comprising:
    a power plant with a charging device;
    an on-board electric power supply connected to the charging device such that with the power plant operating, the charging device supplies electrical current to the on-board electric power supply in order to charge the on-board electric power supply;
    an ignition switch connected to the power plant and the battery, the ignition switch being configured to be manually operated to switch the power plant between an operating state and an off-state;

an electronic input/output port;

an external power supply configured to be manually connected to and manually disconnected from the electronic input/output port;

a plurality of electrically powered accessories;

an input panel/display configured to display a list of the plurality of electrically powered accessories and the input panel/display being further configured to receive input from a vehicle operator including selecting at least one of the plurality of electrically powered accessories displayed by the input panel/display;

a power switching device connected to the on-board electric power supply and the input/output electronic port, the power switching device being configured to switch between a first power setting and a second power setting:

the first power setting includes powering the at least one plurality of electrically powered accessories with power from the on-board electric power supply, and the second power setting includes powering at least one selected electrically powered accessory of the plurality of electrically powered accessories with power from the external power supply and preventing the use of electric power from the on-board electric power supply to the at least one selected electrically power accessory while power is being drawn from the external power supply; and an electronic controller connected to the input panel/display, the on-board electric power supply, the input/output electronic port, the plurality of electrically powered accessories and the power switching device, the electronic controller being configured to operate the input panel/display to display the list of the plurality of electrically powered accessories and receive input from the input panel/display of selections made by the vehicle operator including the selection of the at least one of the plurality of electrically powered accessories, the electronic controller being further configured to electronically operate the switching device to switch from the first power setting to the second power setting in response to detection of power from the external power supply and selection of the at least one of the plurality of electrically powered accessories.

10. The vehicle electronic system according to claim 9, wherein:

the on-board electric power supply is a rechargeable battery.

11. The vehicle electronic system according to claim 10, further comprising:

an ignition switch connected to the power plant and the battery, the ignition switch being configured to be manually operated to switch the power plant between an operating state and an off-state, and the electronic controller is further configured to switch to the second power setting in response to detecting that the power plant in the off-state, in response to detection of power from the external power supply and in response the selection of the at least one of the plurality of electrically powered accessories.

12. The vehicle electronic system according to claim 9, wherein the plurality of electrically powered accessories includes an audio device, a video device, at least one vehicle camera, a security device connected to the at least one vehicle camera, a GPS (global positioning system) and at least one wireless communication device.

13. The vehicle electronic system according to claim 9, wherein the electronic controller being further configured detect a power output level of the external power supply while in the second power setting, and in response the determining that the power output level of the external power supply has dropped below a predetermined level, the electronic controller shuts off the at least one of the plurality of electrically powered accessories and electronically operates the switching device to switch from the second power setting to the first power setting.

14. The vehicle electronic system according to claim 9, wherein the electronic controller is further configured to compare the power available from the external power supply and corresponding power requirements of each of the plurality of electrically powered accessories and operate the input panel/display to display only those ones of the plurality of electrically powered accessories with power requirements that can be met by power available from the external power supply and receive further selection by the vehicle operator selecting only those ones of the plurality of electrically powered accessories with power requirements that can be met by power available.

* * * * *